United States Patent
Knoedgen

(10) Patent No.: US 9,823,677 B2
(45) Date of Patent: Nov. 21, 2017

(54) POWER CONVERTER

(71) Applicant: Dialog Semiconductor (UK) Limited, Reading (GB)

(72) Inventor: Horst Knoedgen, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 7 days.

(21) Appl. No.: 14/586,149

(22) Filed: Dec. 30, 2014

(65) Prior Publication Data

US 2016/0077536 A1    Mar. 17, 2016

(30) Foreign Application Priority Data

Sep. 16, 2014 (DE) .......... 10 2014 218 597

(51) Int. Cl.
*H05B 33/08* (2006.01)
*G05F 1/575* (2006.01)

(52) U.S. Cl.
CPC ......... *G05F 1/575* (2013.01); *H05B 33/0812* (2013.01)

(58) Field of Classification Search
CPC .... H05B 37/02; H05B 33/08; H05B 33/0836; H05B 33/0815; H05B 33/0839; G05F 1/40; G05F 1/10; G05F 1/575; H02M 3/156; H02M 3/158; H02M 2001/0006
See application file for complete search history.

(56) References Cited

U.S. PATENT DOCUMENTS

| 7,671,575 | B1 * | 3/2010 | Suzuki | H02M 3/156 323/284 |
| 8,368,324 | B2 * | 2/2013 | Lin | H05B 33/0827 315/209 R |
| 2004/0218408 | A1 | 11/2004 | Colbeck et al. | |
| 2009/0295228 | A1 * | 12/2009 | Ochi | H02M 3/156 307/66 |
| 2010/0060177 | A1 * | 3/2010 | Takata | H05B 33/0824 315/185 R |
| 2010/0259177 | A1 * | 10/2010 | Mednik | H05B 33/0818 315/185 R |
| 2013/0234621 | A1 * | 9/2013 | Athalye | H02M 3/158 315/307 |

FOREIGN PATENT DOCUMENTS

DE    112009001370    4/2011
DE    10 2014 218 597.1    3/2015

* cited by examiner

*Primary Examiner* — Thai Pham
(74) *Attorney, Agent, or Firm* — Saile Ackerman LLC; Stephen B. Ackerman

(57) ABSTRACT

Control circuit for a power converter that converts an input voltage into an output voltage is disclosed. The control circuit comprises a power switch; a power switch driver coupled with the power switch to control the switching state of the power switch so as to provide the output voltage at an output port of the power converter, the output port for coupling with a first terminal of a load; a load port for coupling with a second terminal of the load; a switching element coupled with the load port to selectively connect the load port to ground; and operating voltage supply means coupled with the load port, for providing an operating voltage to the control circuit.

39 Claims, 2 Drawing Sheets

POWER CONVERTER

TECHNICAL FIELD

This invention relates generally to power converters and relates more specifically to control circuits for power converters, a method to operating power converters to switched DC-DC power converters and in particular to boost converters.

BACKGROUND

Power converters are known in the art. Such power converters typically require a power supply to generate an internal supply voltage Vcc for operation, e.g. to drive a power switch or supply other components with power. In many cases, the internal supply voltage and operating power is derived from the input voltage of the power converter. However, generating Vcc, using e.g. a LDO (Low Dropout Regulator) results in significant losses and heat production. In addition, driving a power switch with a low supply voltage requires a large switch (e.g. transistor) to generate the necessary output power of the converter.

Since power converters have become more efficient and reduction of internal loss has become more important, in particular for mobile applications operated by battery, there is a need to improve efficiency of the generation of the internal power supply.

SUMMARY

The present document provides a power converter control circuit and method having an efficient internal power supply to operate internal components.

According to an aspect, a control circuit for a power converter that converts an input voltage to an output voltage is disclosed. The power converter may be a switched DC-DC converter and in particular a boost converter or step-up converter that converts a low voltage input power into a high voltage output power. However, the present invention may be applied to other converter topologies as well. The power converter has an output port where the output voltage is provided and a load may be connected. The load may be any type of load that can be operated by the power converter, in particular electronic components in a mobile/portable device that are operated from a battery, such as a string of LEDs.

The control circuit comprises at least one power switch, a power switch driver coupled with the at least one power switch to control the switching state of the power switch, and a switching element coupled with a load port. The switching element may selectively connect the load port to ground. A first terminal of the load may be connected with the output port of the power converter to receive the output voltage of the power converter. A second terminal of the load may be connected with the load port. The output voltage at the output port of the power converter is generated by operating the power switch (e.g. periodically turning the power switch ON and OFF) so as to provide the desired output voltage (which may be higher than the input voltage). The output voltage is typically controlled via a feedback circuit to the desired value. The at least one power switch may be a transistor e.g. a MOS FET, in particular of the NMOS or PMOS type. The feedback circuit may generate control signal(s) for the gate(s) of the power switch (es) to control a charge pump process that transfers a charge between charge storage means of the power converter such as inductors and capacitors. This feedback control may be affected e.g. by controlling the ON/OFF times of the power switch (es).

When the switching element connects the load port (and hence the second terminal of the load) to ground, the power converter operates in load supply mode to provide power to the load. An output current generated by the power converter flows through the load (driven by the output voltage at the output port) and via the switching element to ground. The output current may be controlled to have a desired value as needed by the application, e.g. to drive a string of LEDs to produce a desired luminance.

When the switching element disconnects the load port from ground, a high voltage (up to the maximum output voltage of the converter) is provided at the load port. In order to provide an internal operating voltage to components of the power converter, operating voltage supply means are coupled with the load port. For example, the operating voltage supply means provide an operating voltage supply to the power switch driver. While in the following, operation of the control circuit is explained by referring to a power supply for the power switch driver, it is to be understood that other internal components of the control circuit and the power converter may be supplied with power in addition to the power switch driver or alternatively thereto.

Since the generated operating voltage is derived from the output voltage of the power converter, it can be higher than the input voltage (in case of a boost converter) and is generated in an efficient way. Typical switched power converter architectures operate very efficiently and have a high degree of efficiency, higher than other power supplies such as LDOs (low-dropout regulators). Further, since the power switch can be operated with a higher operating voltage (higher than the input voltage), a smaller switch (transistor) can be used, thereby reducing circuit area and further improving efficiency.

The control circuit may further comprise a control unit to control the switching element to selectively connect and disconnect the load port to/from ground for controlled periods of time. The control unit may generate a gate signal for the switching element which may be a transistor such as a MOS FET (e.g. of the NMOS type).

In embodiments, the switching element is controlled synchronously with the power switch operation. For example, the switching element is controlled to disconnect the load port from ground during a period of time when the power switch is open (i.e. in a substantially non-conducting state of the power switch). In a boost converter, when the power switch is opened, the voltage at the drain of the power switch increases and charge is supplied via a diode from a charge storage element (e.g. an inductor) of the power converter to the load. Typically, an output capacitor is connected in parallel to the load to be charged by the power converter via the diode and to provide a more smooth output voltage. During a portion of the time when charge is supplied by the storage element, the load port may be disconnected from ground, thereby, during that portion of time, providing a high voltage at the load port, available for the operating voltage supply means to generate the internal supply voltage.

In embodiments, a capacitor is coupled with the power supply input of the power switch driver to provide operating power to the power switch driver. The operating voltage supply means may be configured to charge the capacitor to the operating voltage of the power switch driver, based on the high voltage provided at the load port when the switching element is open and the load port consequently disconnected from ground. The capacitor provides for power supply of the power switch driver during times when the switching element is closed and only a small voltage (<1V) exists at the load port. The charge stored in the capacitor maintains the power supply for the power switch driver during these times.

In embodiments, the operating voltage supply means comprises a diode or another switching element coupled with one terminal thereof to the load port, to allow for a controlled charging of the capacitor. The diode or another switching element may be further coupled with its other terminal to the capacitor. For example, only if the voltage at the load port is higher than the forward voltage of the diode plus the voltage at the capacitor, current flows from the load port to charge the capacitor. When the switching element is closed and the voltage at the load port is low, no current flows from the load port to the capacitor.

The other switching element may be controlled synchronously with the switching element, e.g. opened before the switching element (that connects the load port to ground) is closed. Thus, current flow from and discharge of the capacitor is prevented at times when the load port is grounded and output current is provided by the power converter to the load. The diode provides a similar function in preventing discharge of the capacitor.

In embodiments, an additional voltage regulator is coupled with an input port of the power converter to receive the input voltage, and coupled with the power switch driver (and/or the capacitor) to provide a regulated operating voltage for the power switch driver. Since a voltage regulator such as an LDO typically has a lower efficiency than a switched power converter, the voltage regulator may be used to control (regulate) the supply voltage for the power switch driver while the majority of the supply power is provided by the operating voltage supply means from the power converter output voltage/power. In addition, the voltage regulator may be used only during a startup phase of the power converter when no or only a small output voltage is present. The voltage regulator may be disabled after startup when the power converter operates.

In embodiments, a startup switch or a startup diode is coupled with an input port of the power converter to receive the input voltage, and further coupled with the power switch driver (and/or the capacitor) to provide a startup operating voltage for the power switch driver. When the startup switch is initially closed, the input voltage is temporarily supplied to the power switch driver (and/or the capacitor) as operating voltage. As soon as the power converter starts operating and generating a sufficient output voltage, the startup switch may be disabled and the power switch driver disconnected from the input voltage. Alternatively, the startup diode may provide a startup operating voltage for the power switch driver, as long as the input voltage is larger than the voltage feedback from load node. In any case, a back coupling of the generated operating voltage after startup to the input voltage should be avoided. Startup switch and startup diode are simple means for system startup, in particular when the input voltage is smaller than the desired operating voltage.

In embodiments, the control unit comprises a comparator coupled with the generated operating voltage for the power switch driver and with a reference voltage. The comparator may be a comparator with hysteresis. The comparator allows control of the magnitude of the generated operating voltage so that a regulated and stable power supply for the power switch driver is obtained.

The control unit may further comprise a logic unit. The control unit may be coupled with the gate of the switching element to provide a gate control signal. The control unit may further receive a power switch control signal so that it can synchronize switching element operation with power switch operation. For example, the logic unit may generate the gate control signal for the switching element so that the switching element is open during a portion of the time when the power switch is open.

Since the available power provided by the power converter at its output node is typically much higher than what is needed for operating the power switch driver (e.g. N times higher), the logic unit may be configured to open the switching element only every Nth cycle of the power switch, thereby disconnecting and increasing the voltage at the load port only every so often. This results in occasional charge of the capacitor for providing power supply to the power switch driver while still providing sufficient operating power to the power switch driver. Typically, a reasonably sized capacitor is sufficient for the power requirements of the power switch driver.

Due to the relatively moderate power requirements of the power switch driver, the power converter may be configured in a current limited mode when the switching element is open, a high voltage is present at the load port, and operating voltage is generated for the power switch driver. For example, the power switch driver may be configured to drive the power switch so as to operate in the current limited mode in which the output power provided by the power converter may be reduced, e.g. by appropriately controlling the ON/OFF times of the power switch.

In embodiments, the operating voltage supply means may comprise an overvoltage protection mechanism to limit the operating voltage for the power switch driver. The overvoltage protection mechanism may e.g. include a Zener-diode connected in parallel to the capacitor.

According to another aspect, a power converter comprising a control circuit as described above is provided. The power converter may further comprise an inductor coupled with the power switch, a diode coupled with the power switch and the output port, and a load capacitor coupled with the output port and the load port.

According to another aspect, a method for operating a power converter that converts e.g. a low voltage input power into a high voltage output power (i.e. a boost converter) is provided. The method comprises: operating a power switch driver coupled with a power switch to control the switching state of the power switch, and operating a switching element coupled with a load port to selectively switch the load port to ground and to thereby provide an operating voltage from the load port to the power switch driver. The power switch is controlled by its gate voltage so as to provide a high output voltage at an output port of the power converter. Terminals of a load may be coupled with the output port and the load port.

The operating a switching element may include an opening of the switching element to disconnect the load port from ground during portions of the time when the power switch is open. Thus, during times when the power converter supplies charge from its internal charge storing means to an output capacitor, the voltage at the load port is high and power can be feed back to the power switch driver or a capacitor connected therewith.

The method may further comprise operating another switching element coupled between the load port and a power supply port of the power switch driver. The other switching element may be opened before the switching element is closed to avoid that the power switch driver supply is grounded, in particular the capacitor is discharged.

The method may further comprise providing a startup supply voltage to the power switch driver during a startup phase of the power converter before a high output voltage is available at the output port. This allows startup of the power converter. Once a high output voltage is available, the startup supply voltage may be disabled and the power supply of the power switch driver is only from the output voltage, thereby achieving high efficiency.

It should be noted that the above mentioned aspects for a control circuit of a switched power converter are applicable for the suggested method of operating a power converter as well and vice versa. Thus, all aspects disclosed for embodiments of the circuit can be combined in many ways with the suggested method to achieve similar effects and advantages.

These and other aspects of the invention will be apparent from and elucidated with reference to the embodiments described hereinafter, by way of example, with reference to the drawings.

BRIEF DESCRIPTION OF THE DRAWINGS

In the accompanying drawings forming a material part of this description, there is shown.

DETAILED DESCRIPTION

Figure 1:
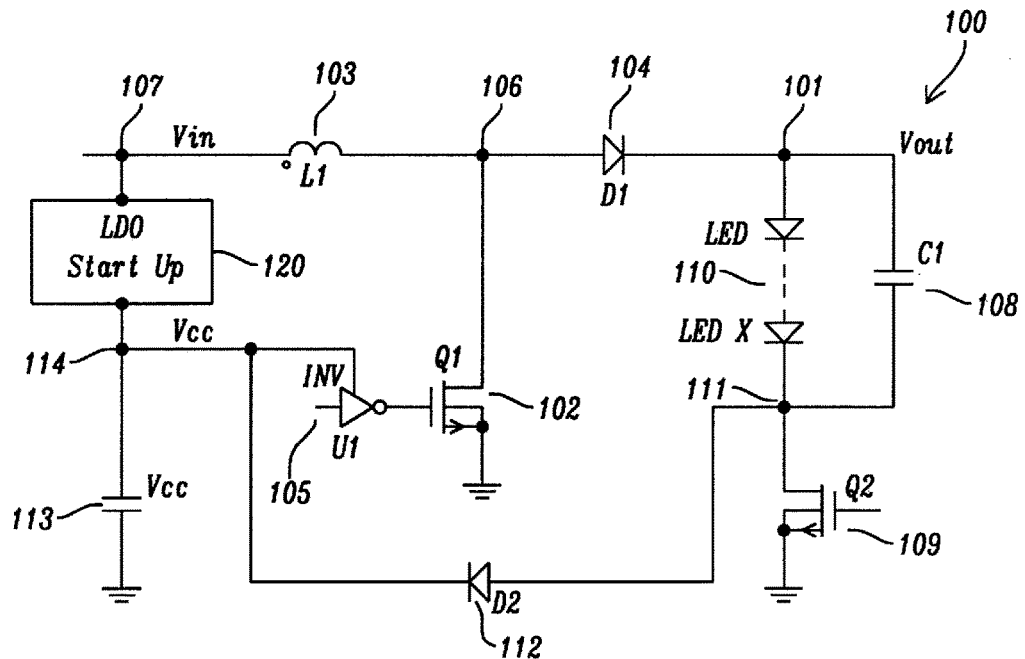
FIG. 1 shows an embodiment of a power converter.

Various aspects are explained below in an exemplary manner with reference to the accompanying drawings, wherein:

FIG. 1 shows an example of a switched power converter 100 that generates an output voltage at an output node 101 that is higher than the input voltage Vin, i.e. a boost or step-up converter. The power converter 100 has a power switch 102, here a NMOS transistor Q1, an inductor L1 103, and a diode D1 104. The power switch 102 is driven by a power switch driver 105, shown as an inverter U1. The output of the power switch driver 105 is connected with the gate of the power switch 102. The inductor 103 is connected between the input node 107 and an internal node 106. The diode 104 is connected between the internal node 106 and the output node 101. The drain of the power switch 102 is connected with the internal node 106. If the power switch 102 is closed (i.e. in a conducting state), current can flow through the inductor 103 and a magnetic field builds up in the inductor. If the power switch 102 is opened, the voltage at the internal node rises and current can flow through the diode 104 to the output node 101, through the load 110 (here a string of LEDs, but any other load is possible) and into output capacitor 108 connected in parallel to the load 110. A switching element 109 is connected between load node 111 and ground, its drain connected to load node 111 and its source connected with ground. When the power converter is in the load supply mode, the switching element 109 (here PMOS transistor Q2) is closed, connecting load node 111 to ground. Thus, power is supplied to the load 110. The output voltage Vout at node 101 is typically controlled by appropriately controlling the ON/OFF times of the power switch 102, typically via a feedback circuit tapping the output voltage Vout and comprising a logic unit (not shown) to produce PWM (pulse width modulated) or PFM (pulse frequency modulated) control signals that are applied to the gate of the power switch 102. It must be noted that other power architectures comprise one or more power switches and storage elements such as inductors and/or capacitors. The present invention is not limited to the boost architecture of FIG. 1 and can be applied to other switched power converter architecture as well.

In order to generate an internal power supply for the control circuit or the power converter, the switching element 109 is opened so that the voltage at load node 111 rises. The power converter then operates in internal supply mode. Current flows via diode D2 112 to Vcc node 114 and is available for power supply of internal components such as for power switch driver 105. The current may for example be used to charge capacitor 113 (coupled with Vcc node 114) so that an operating voltage Vcc is generated at one terminal thereof. The operating voltage Vcc may for example be supplied to the power switch driver 105 or other components to provide an internal power supply of the power converter.

Once the desired operating voltage Vcc is obtained at Vcc node 114, the switching element 109 is closed again and the power converter continues operation in load supply mode. It must be noted that also in internal supply mode, current flows through the load 110, but this current may be smaller than in load supply mode. Typically, the switching element 109 is opened only for a portion of the time when the power switch 102 is opened. Due to the relatively small power that is needed for the internal power supply (compared to the larger power provided by the power converter), the portion of the time when the switching element 109 is opened is small. As already mentioned, power switch 102 and switching element 109 are operated synchronously and the control unit (not shown) that generates the gate control signal for the switching element preferably receives the gate control signal for the power switch to operate synchronously with the power switch.

Figure 3:
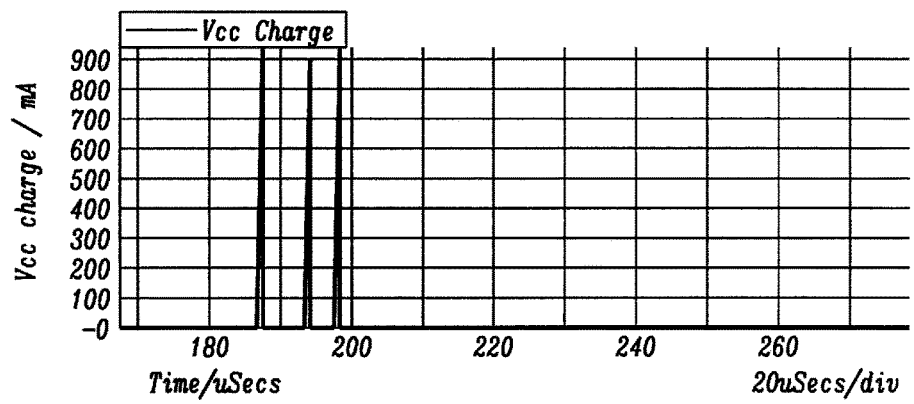
FIG. 3 shows an example of internal power supply current.

FIG. 3 shows the Vcc charging current that flows through the diode 112 when the switching element is opened. The Vcc charging current provides the operating voltage Vcc, e.g. by charging the capacitor 113 up to the desired voltage. As one can see from FIG. 3, the Vcc charging current is limited to small Vcc charging periods, during which the switching element 109 is opened. When the switching element 109 is closed, no Vcc charging current is provided. Further, by choosing an appropriate capacitance at capacitor 113, one can design the Vcc charging current to be concentrated in small Vcc charging periods where the amount of the Vcc charging current is similar to the typical load current. In this case, the load current in load supply mode and in internal supply mode is similar so that no impairment on the load occurs, and the Vcc charging period are small.

In addition, switching element 109 may be opened only every other power switch operating cycle, e.g. only every Nth switching event when the power switch 102 is opened. Thus, Vcc charging is more infrequent, reducing the times when the switching element 109 disconnects the load node 111 and the load 110 from ground. Further, Vcc charging current during the rare charging intervals can be increased, so as to better fit with the load current during load supply mode.

To even further adjust load current and Vcc charging current, the power converter may be operated in a current limited mode when the switching element is open and Vcc charging current is generated. When in the current limited mode, the output power provided by the power converter is reduced e.g. by controlling ON/OFF times of the power switch 102, or by other appropriate means to reduce the available load current.

The above circuit arrangement provides for a very efficient means to generate internal supply voltage as the internal power supply is taken from the output power of the converter. Since typical efficiencies of switched power converters are high (>95%), internal loss of the power converter is reduced and efficiency even further improved. No extra power supply to generate the power converter operating voltage is necessary. The transistor of switching element 109 need not be of a high voltage type even though the generated output voltage may be high.

In an optional modification of the control circuit (shown in FIG. 1), a voltage regulator 120 (e.g. a LDO regulator) is provided to provide an operating voltage Vcc for the control circuit during start up, i.e. when the power converter is switched on and before a sufficient output voltage Vout is generated at the output node 101 by the switching ON/OFF of the power switch 102. The voltage regulator 120 is connected with the power converter input node 107 and the Vcc node 114. During start up, the operating voltage Vcc is generated by the voltage regulator 120 which can be switched off when the output voltage Vout (and hence the Vcc charging current and operating voltage Vcc) has been build up. In another modification, the voltage regulator 120 may stay enabled even after start up. However, the voltage regulator 120 may be designed to provide only a small current so that the losses by the voltage regulator 120 may be kept low. The major current contribution to the Vcc charging current is from feeding back load current when the switching element 109 is opened.

In a typical example, the current to drive the 5 V gate of power switch Q1 102 will be around 5-10 mA. The input voltage Vin is 25 V and the output voltage Vout at the LED string (load 110) is about 40 V. An LDO used to generate the operating voltage Vcc for the power switch driver then sees a voltage of 20 V. The loss of the LDO is in this case 100-200 mWatt, which is too high for many applications.

According to the disclosed concept, the LDO will start to charge Vcc to 5 V. The system starts to operate while the LED string (load node 111) is switched to ground (via switching element Q2 109). If Vcc drops below a defined level, Q2 will get turned off and current coming from the LED charge will supply Vcc via diode D2 122 and charge up Vcc without any resistive losses. Once the desired Vcc level is obtained, Q2 may be closed again. If Vcc drops below a defined level, Q2 will get turned off again. The LDO can be switched off after the start up, because the charge current via the LED string will be enough to operate the power switch driver. Power switch Q1 102 is a high voltage device, but switching element Q2 109 can be a 5 V type. Alternatively, the LDO may stay on after startup to supply a small current for the power supply. This allows that a constant charge current is drawn via the LED string, preferably matching the load current during load supply mode, so that the load current is constant for load and internal supply mode. Any current/power variation during Vcc charging is dealt with by the LDO.

In another modification of the control circuit of FIG. 1, diode D2 112 is replaced by another switching element controlled e.g. by the control unit that also controls the operation of the switching element 109. This allows further reducing internal loss when current is feedback from load node 111 to Vcc node 114 because the ON resistance of the other switching element is lower than the forward resistance of diode D2. For this purpose, the other switching element is switched ON to allow the Vcc charging current to pass when switching element 109 is open. In order to avoid any current drain from Vcc node 114 and capacitor 113, it is preferred to open switching element 109 before opening the other switching element. Similar, the other switching element should be closed before closing switching element 109 so that no charge from capacitor 113 can disappear to ground. Preferably, in order to provide synchronous operation switching element 109 and the other switching element are controlled by the same control unit that generates control signals for the gates of both switching elements.

Figure 2:
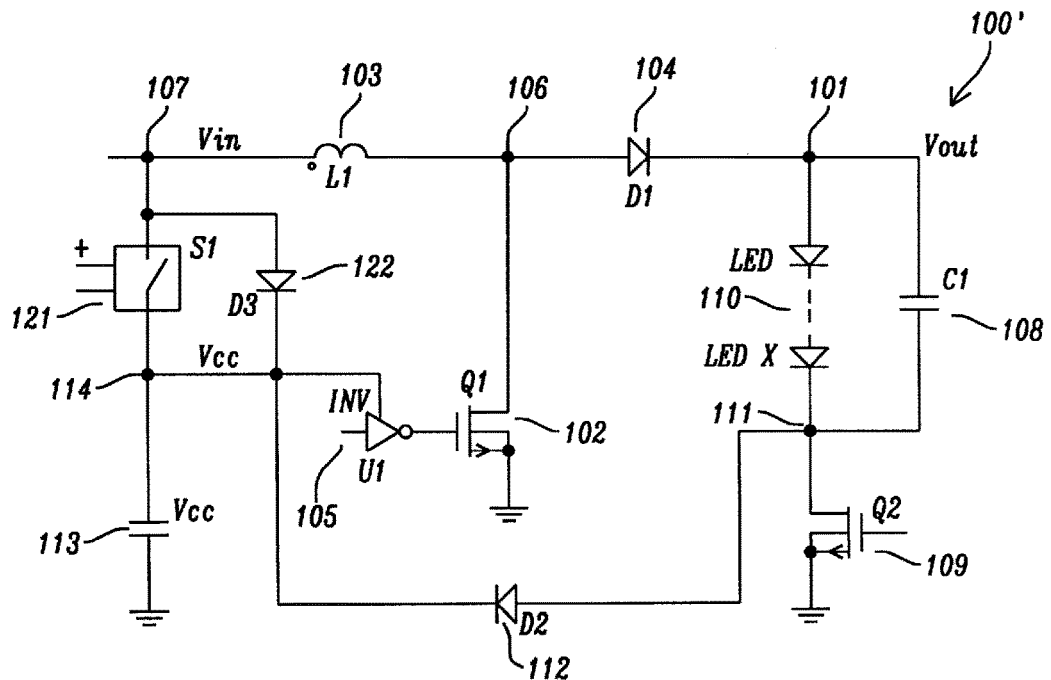
FIG. 2 shows another embodiment of a power converter.

FIG. 2 shows another example for a power converter 101' embodying the present invention. This example is particular useful when the input voltage Vin is lower than the desired operating voltage, and provides a simpler circuit than the example of FIG. 1.

Most elements of FIG. 1 are present again in the depicted circuit and marked with the same reference numbers. However, the voltage regulator 120 is replaced with a startup switch S1 121 or a diode D3 122 (FIG. 2 shows both elements; however, it must be noted that only one element is necessary). During startup, for example startup switch 121 may be closed to charge the capacitor 113 at Vcc node 114 so that an operating voltage is obtained to drive the power switch driver 105 and the power switch 102. Even though this operating voltage is lower than the desired operating voltage (because Vin is smaller than the desired operating voltage), it is typically sufficient to operate the power switch driver 105 and the power switch 102. Once the power converter starts operating and the output voltage Vout has built up, the startup switch 121 is opened and Vcc is generated by feeding back charge from load node 111 when switching element 109 is open. Once the desired operating voltage is obtained, the power switch driver 105 and the power switch 102 operate in their preferred operating range, hence efficient operation is achieved.

In an alternative, startup diode D3 122 is connected between input node 107 and Vcc node 114 to provide the operating voltage Vcc until the voltage at load node 111 is higher than the input voltage Vin (for the switching element 109 being open) and the Vcc charging current from load node 111 takes over the internal power supply.

In the example of FIG. 2, the system will start under low Vcc conditions either with the startup switch S1 121 or the startup diode D3 122. When the converter starts to operate, Vcc will be charged to the optimum voltage via the diode D2 112 and then the switching element Q2 109 will be switched to ground. Vcc will toggle around the optimum value. In this case, all the switches can be designed to the best driving conditions.

Figure 4:
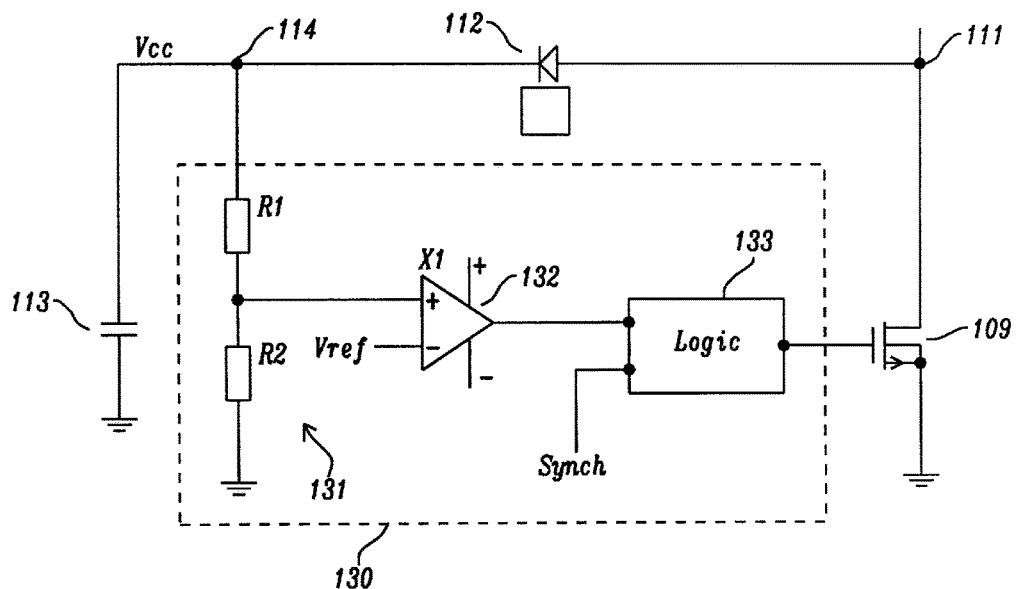
FIG. 4 shows an example of an internal voltage regulator.

FIG. 4 shows partially another example for a control circuit embodying the present invention. The figure shows the diode 112 connected between load node 111 and Vcc node 114 (alternatively, there may be another switching element as mentioned above), and a control unit 130 to generate the drive signal for the switching element 109. Control unit 130 comprises a voltage divider including two resistors R1 and R2 to provide a scaled operating voltage (Vcc divided by a scaling factor). As known in the art, the scaling is defined by the values of the resistors R1 and R2. The scaled operating voltage is input to a comparator 132 which also receives a reference voltage Vref that represents the desired operating voltage Vcc. The output of the comparator 132 is input to a logic unit 133 that generates a gate control signal for the gate of the switching element 109. Logic unit 133 further receives synchronization information to generate the gate control signal synchronously with the control signal for the power switch 102. For example, the logic unit 133 receives the power switch gate control signal as generated by the power switch driver 105. In case that the another switching element is applied instead of the diode 112, control unit 130, and in particular logic unit 133, may also generate the gate control signal for the another switching element that, as discussed above, should also operate synchronously with the switching element 109.

Comparator 132 compares the scaled operating voltage with the reference voltage Vref and generates a signal to switch switching element 109 off when the scaled operating voltage is less than the reference voltage Vref, thereby initiating recharge of the capacitor 113 until the scaled operating voltage is higher than the reference voltage Vref and the comparator cancels the signal. Thus, the scaled operating voltage Vcc will toggle around the reference voltage Vref and the operating voltage Vcc will be controlled to the desired value (scaling factor*reference voltage Vref).

The disclosed concept shows how a stable internal supply voltage Vcc can be efficiently generated in a power converter. The supply voltage Vcc can be used as operating voltage for internal components such as the power switch driver and others, and is derived (during power converter operation after startup) from the output voltage Vout of the power converter which is produced in an efficient way. Typically, the efficiency of a switching regulator is much better than a linear regulator. The concept may be applied to a boost converter, e.g. used to supply a LED string as load, where the output voltage Vout is higher than the input voltage. The generated supply voltage Vcc can be precisely regulated. Optionally, a separate voltage regulator such as an LDO can be provided. The suggested control circuit may be implemented on a chip that also accommodates other control functions of the power converter. In result, Vcc charging is achieved over a large range without resistive losses.

As already mentioned, the LED string is an example of the load; the disclosed invention can work with any load. During times when charging Vcc, the current supplied by the power converter can be reduced if required. For example, a fixed current can charge Vcc from the LED string. Furthermore, the supplied power can be split with an additional voltage regulator (if present): if 15 mA of current is needed for supplying the power switch driver, 10 mA may come from the power converter output via the LED string and 5 mA from an LDO (as example of a voltage regulator). This allows that the LED current is constant while the LDO can balance any current difference. A shunt function for Vcc can avoid any Vcc overvoltage. The elements of the control circuit can be designed or optimized for only small Vcc supply variations. Less heat is produced as resistive losses are reduced.

It should be noted that the description and drawings merely illustrate the principles of the proposed methods and devices. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A control circuit for a power converter that converts an input voltage into an output voltage, comprising
    a power switch;
    a power switch driver coupled with the power switch to control the switching state of the power switch so as to provide the output voltage at an output port of the power converter, the output port for coupling with a first terminal of a load;
    a load port for coupling with a second terminal of the load;
    a switching element coupled with the load port to selectively connect the load port to ground, wherein the switching element is controlled in synchronism with the power switch;
    a circuit coupled with the load port, configured to provide an operating voltage to the control circuit; and
    a logic unit coupled with the gate of the switching element, the logic unit for generating a gate drive signal for the switching element so that the switching element is open during a portion of the time when the power switch is open.

2. The control circuit of claim 1, wherein the switching element is controlled to disconnect the load port from ground during a period of time when the power switch is open.

3. The control circuit of claim 1, wherein the operating voltage is provided as power supply to the power switch driver.

4. The control circuit of claim 1, wherein the circuit configured to provide the operating voltage comprises a capacitor that is coupled with the power switch driver to provide operating power to the control circuit, the circuit configured to provide the operating voltage is also configured to charge the capacitor to a predetermined operating voltage.

5. The control circuit of claim 1, wherein the circuit configured to provide the operating voltage comprises a diode or another switching element coupled with the load port.

6. The control circuit of claim 5, wherein the diode or another switching element is further coupled with the capacitor.

7. The control circuit of claim 5, wherein the other switching element is controlled in synchronism with the switching element.

8. The control circuit of claim 7 wherein the other switching element is opened before the switching element is closed.

9. The control circuit of claim 1, further comprising a voltage regulator coupled with an input port of the power converter to receive the input voltage, and providing a regulated operating voltage.

10. The control circuit of claim 1, further comprising a startup switch or a startup diode coupled with an input port of the power converter to receive the input voltage, and providing a startup operating voltage for the control circuit.

11. The control circuit of claim 9, wherein the voltage regulator or a startup switch is enabled only for a startup phase of the power converter and disabled thereafter.

12. The control circuit of claim 1, wherein the control unit comprises a comparator coupled with the operating voltage and a reference voltage.

13. The control circuit of claim 1, wherein the logic unit is configured to open the switching element only every Nth switching event when the power switch is opened.

14. The control circuit of claim 1, wherein the power switch driver is configured to drive the power switch in a current limited mode when the switching element is open and operating voltage is generated, the output power provided by the power converter being reduced in the current limited mode.

15. The control circuit of claim 1, wherein the circuit configured to provide the operating voltage comprises an overvoltage protection mechanism to limit the operating voltage.

16. The control circuit of claim 1, wherein the power converter is a boost converter that converts a low input voltage into a higher output voltage.

17. The control circuit of claim 1, wherein the load is a string of light emitting diodes.

18. A power converter comprising:
a control circuit for a power converter that converts an input voltage into an output voltage, comprising
a power switch;
a power switch driver coupled with the power switch to control the switching state of the power switch so as to provide the output voltage at an output port of the power converter, the output port for coupling with a first terminal of a load;
a load port for coupling with a second terminal of the load;
a switching element coupled with the load port to selectively connect the load port to ground, wherein the switching element of the control circuit is controlled in synchronism with the power switch; and
a circuit coupled with the load port, configured to provide an operating voltage to the control circuit;
an inductor coupled with the power switch; and
a diode coupled with the power switch and an output port; and
a logic unit coupled with the gate of the switching element, the logic unit for generating a gate drive signal for the switching element so that the switching element is open during a portion of the time when the power switch is open.

19. The power converter of claim 18, wherein the load is a string of light emitting diodes.

20. The power converter of claim 18, wherein the switching element is controlled to disconnect the load port from ground during a period of time when the power switch is open.

21. The power converter of claim 18, wherein the operating voltage is provided as power supply to the power switch driver.

22. The power converter of claim 18, further comprising a capacitor that is coupled with the power switch driver to provide operating power to the control circuit, the circuit configured to provide the operating voltage is also configured to charge the capacitor to a predetermined operating voltage.

23. The power converter of claim 18 wherein the circuit configured to provide the operating voltage comprises a diode or another switching element coupled with the load port.

24. The power converter of claim 23, wherein the diode or another switching element is further coupled with the capacitor.

25. The power converter of claim 23 wherein the other switching element is controlled in synchronism with the switching element.

26. The power converter of claim 25, wherein the other switching element is opened before the switching element is closed.

27. The power converter of claim 18, further comprising a voltage regulator coupled with an input port of the power converter to receive the input voltage, and providing a regulated operating voltage.

28. The power converter of claim 18, further comprising a startup switch or a startup diode coupled with an input port of the power converter to receive the input voltage, and providing a startup operating voltage for the control circuit.

29. The power converter of claim 27, wherein the voltage regulator or a startup switch is enabled only for a startup phase of the power converter and disabled thereafter.

30. The power converter of claim 18, wherein the control unit comprises a comparator coupled with the operating voltage and a reference voltage.

31. The power converter of claim 18, wherein the logic unit is configured to open the switching element only every Nth switching event when the power switch is opened.

32. The power converter of claim 18, wherein the power switch driver is configured to drive the power switch in a current limited mode when the switching element is open and operating voltage is generated, the output power provided by the power converter being reduced in the current limited mode.

33. The power converter of claim 18, wherein the circuit configured to provide the operating voltage comprises an overvoltage protection mechanism to limit the operating voltage.

34. The power converter of claim 18, wherein the power converter is a boost converter that converts a low input voltage into a higher output voltage.

35. The power converter of claim 18, wherein a load capacitor is connected in parallel to the load.

36. A method for operating a power converter that converts an input voltage into an output voltage, the method comprising:
operating a power switch driver coupled with a power switch to control the switching state of the power switch so as to provide the output voltage at an output port of the power converter, wherein a load is coupled with the output port and a load port;
operating a switching element coupled with the load port to selectively switch the load port to ground and to thereby provide an operating voltage from the load port to the power switch driver;
controlling the switching element in synchronism with the power switch;
coupling a logic unit with the gate of the switching element; and
generating, by the logic unit, a gate drive signal for the switching element so that the switching element is open during a portion of the time when the power switch is open.

37. The method of claim 36, wherein the switching element is opened to disconnect the load port from ground during portions of the time when the power switch is open.

38. The method of claim 36, further comprising operating another switching element coupled between the load port and a power supply port of the power switch driver, the another switching element opened before the switching element closed.

39. The method of claim 36, further comprising providing a startup supply voltage to the power switch driver during a startup phase of the power converter before a high output voltage is available at the output port.

\* \* \* \* \*